(12) United States Patent
Terajima

(10) Patent No.: US 7,944,636 B2
(45) Date of Patent: May 17, 2011

(54) LENS DRIVING DEVICE

(75) Inventor: Kokichi Terajima, Tokyo (JP)

(73) Assignees: Micro Win Tech Inc., Tokyo (JP); Largan Precision Co., Ltd., Taichung (TW); Kokichi Terajima, Tokyo (JP)

( * ) Notice: Subject to any disclaimer, the term of this patent is extended or adjusted under 35 U.S.C. 154(b) by 0 days.

(21) Appl. No.: 12/656,468

(22) Filed: Feb. 1, 2010

(65) Prior Publication Data
US 2010/0232042 A1 Sep. 16, 2010

(30) Foreign Application Priority Data

Mar. 10, 2009 (JP) .................................. 2009-055834

(51) Int. Cl.
*G02B 7/02* (2006.01)
(52) U.S. Cl. ...................... 359/824; 359/822; 359/814
(58) Field of Classification Search .......... 359/694–700, 359/811–824
See application file for complete search history.

(56) References Cited

U.S. PATENT DOCUMENTS

| | | | | |
|---|---|---|---|---|
| 7,054,078 B2 * | 5/2006 | Fujita | ............................ | 359/814 |
| 7,221,526 B2 * | 5/2007 | Manabe | ........................ | 359/824 |
| 7,652,835 B2 * | 1/2010 | Wang et al. | .................... | 359/824 |

FOREIGN PATENT DOCUMENTS

JP 2004-280031 10/2004

* cited by examiner

*Primary Examiner* — Mohammed Hasan
(74) *Attorney, Agent, or Firm* — Bacon & Thomas, PLLC

(57) ABSTRACT

In the present invention, a lens driving device has appropriate offset for miniaturization, excellent linearity of driving current versus displacement, and good displacement sensitivity. A casing holding a yoke with at least one permanent magnet mounted on an inner circumference thereof is connected with a lens holder having a driving coil installed on an outer sidewall thereof between an upper spring member and a lower spring member. When the driving coil is not powered, the lens holder props against the casing at a side opposite to an imaged object. When the lens holder props against the casing, the position of the driving coil along Z axis causing a magnitude of driving magnetic field intersecting with the driving coil is 50%~90% of a maximum value of the driving magnetic field intersecting with the driving coil while the lens holder moves toward the imaged object.

4 Claims, 7 Drawing Sheets

LENS DRIVING DEVICE

FIELD OF THE INVENTION

The present invention relates to an electromagnetically-driven lens driving device used in a camera module of a mobile phone.

DESCRIPTION OF RELATED ART

In recent years, the increase in pixel number of an image sensor for the camera equipped in the mobile device is gradually advancing the quality of photographic image. Along with such tendency, the lens system equipped in such devices is modified from conventional fixed-focal type camera modules to vari-focal type camera modules. This is because the fixed-focal type camera modules may suffer serious out-of-focus problem and be unable to support the resolution performance of the image sensor with a large amount of pixels.

As shown in FIG. 12, a conventional lens driving device 50 installed with a voice coil motor is generally used to implement the driving scheme of the lens system in the vari-focus type camera module (For example, please refer to Patent Document 1).

In the figure, the lens driving device 50 comprises: a yoke 51 made of magnetic substance, such as soft iron, with a U-shaped cross-section, a permanent magnet 52 mounted on an inner sidewall of the yoke 51, a lens holder 54 for holding at least one lens 53 at a center position, a driving coil 55 mounted on the lens holder 54, a casing 56 whose inner circumference being mounted with the yoke 51, an upper spring member 57A and a lower spring member 57B connecting the lens holder 54 and the casing 56.

Furthermore, an optic axis of the lens 53 is in the up-and-down direction. The upper side of FIG. 12 is designated as an imaged-object side (not shown). The up-and-down direction is referred hereinafter as a direction of Z axis, wherein the upper side is referred to a forward direction of Z axis, the lower side is referred to a backward direction of Z axis.

The spring members 57A, 57B are in the shape of flat plate if no bending moment is applied thereon. However, when mounted with the lens holder 54 and the casing 56, the spring members 57A, 57B are subject to a bending moment and become in a deflected state such that the fulcrums of the spring members 57A, 57B at the side of the casing 56 are closer to the backward direction of Z axis than the fulcrums of the spring members 57A, 57B at the side of the lens holder 54. In this way, the restoring force causing by bending the spring members 57A, 57B would bias the lens holder 54 toward the casing 56. In other word, the spring members 57A, 57B are assembled on the fulcrums at the side of the lens holder 54 and the side of the casings 56 in the condition of being applied with an offset biasing toward the backward direction of Z axis.

The permanent magnet 52 is a cylindrical magnet, or may be a plurality of arc-shaped magnets which are circularly-arranged on the inner wall of the yoke 51.

The driving coil 55 is placed in a radially-distributed magnetic field applied by the yoke 51 and the permanent magnet 52 around the coil. Therefore, when the driving coil 55 is powered, a Lorentz force will be generated in a direction toward the imaged-object (the forward direction of Z axis shown by an arrow of FIG. 12), and moving the lens holder 54 to a position where the Lorentz force and the restoring force of the spring members 57A, 57B are balanced.

That is, by manipulating the current value powering the driving coil 53, the displacement of the lens holder 52 may be controlled so as to control the position of the lens 53.

FIG. 13 is an ideal diagram of driving current verse displacement for a lens driving device. The transverse axis in the figure indicates the value of driving current, and the longitudinal axis in the figure indicates the displacement of the lens holder 54.

Under the situation that the permanent magnet 52 applies an even magnetic field on the driving coil 55, when the driving coil 55 is powered by the driving current, before the value of driving current reaches an initial current value A, the lens holder 54 is subject to the bias of the offset exerted by the spring members 57A and 57B and resists against the casing 56. Upon the value of driving current exceeding the initial current value A, the lens holder 54 moves toward the forward direction of Z axis according to the following Hook's rule:

(Displacement)=(A driving force caused by the driving current)/(Coefficient of spring)

Patent Document 1: JP 2004-280031

However, in order to advance the low-profiling and radial miniaturization of the lens driving device, the tendency is to shrink the height and thickness of the permanent magnet 52, which this, in turn, results in the decrease of the strength of driving magnetic field generated by the permanent magnet 52, and also makes it more difficult to place the driving coil 55 in the uniform magnetic field. As a result, the linearity characteristic of the driving current verse displacement is degraded.

Moreover, in order to advance the low-profiling and radial miniaturization of the lens driving device, it may be difficult to obtain sufficient offset among the fulcrums of the spring members 57A, 57B. In addition, the driver of the lens driving device is not configured to accommodate with the characteristics of most existing lens driving device. It is difficult to significantly change the value of the initial current A in prior art.

In the light of the drawback in prior art, the present invention is aimed to provide a lens driving device whose spring members can provide an appropriate offset required by the miniaturization of the device and being with excellent linearity of driving current versus displacement as well as appropriate displacement sensitivity.

BRIEF DESCRIPTION OF THE INVENTION

The present invention provides a lens driving device comprising a lens holder for holding at least one lens, a driving coil mounted on an outer sidewall of the lens holder and wound around an optic axis of the lens, permanent magnets placed around an outer circumference of the driving coil and being opposite to and separated from the driving coil with a spacing, a casing for holding the permanent magnets, and spring members connecting the lens holder and the casing. In a condition that the driving coil is not powered, the compressive stress of the spring members forces the lens holder to prop against the casing at an opposite side of the imaged object, and, when the driving coil is powered, the lens holder is moved toward the imaged object. The lens driving device is characterized in that, when the driving coil is unpowered, the driving magnetic field intersecting with the driving coil is among 50%~90% of a maximum value of the driving magnetic field intersecting with the driving coil during the lens holder moves toward the imaged object.

In order to maintain the distribution of the driving magnetic field intersecting with the driving coil, an initial position of the driving coil is located at a place where the magnitude of the driving magnetic field intersecting with the driving coil is in the range of 50%~90% of the maximum value, to provide appropriate offset, improve the linearity of driving current versus displacement, and obtain higher displacement sensitivity.

Furthermore, the present invention is characterized in that the polarity of the permanent magnets at a side close to the lens holder is either all N-polarity, or all S-polarity. In this way, the configuration of the permanent magnets may be simplified.

Furthermore, the present invention is characterized in that the driving coil includes a first coil and a second coil winding in the directions different from each other, wherein the second coil is placed at a side of the first coil close to the imaged object. The permanent magnets include a first magnet and a second magnet with different magnetic polarity at the side close to the lens holder. The first magnet is placed facing the first coil, and the second magnet is placed facing the second coil.

In this way, the demagnetized field of the permanent magnets may be weakened, and the linearity of driving current vs. displacement and displacement sensitivity may be further improved.

Furthermore, the present invention is characterized in that the permanent magnets include an upper magnet mounted at the side of the imaged object and a lower magnet mounted at the side opposite to the imaged object. The polarity of the lower magnet at the side close to the lens holder is different from the polarity of the upper magnet at the side close to the lens holder. Also, the magnitude of magnetic field intersecting with the driving coil is smaller than the one intersecting with the upper magnet.

In such configuration, the demagnetized field may be weakened, and the linearity of driving current vs. displacement may be further improved. Also, such a configuration only requires one driving coil, which simplifies the structure of the lens driving device.

DETAILED DESCRIPTION OF THE INVENTION

The present invention will now be described with detailed embodiments. The following embodiments do not intend to confine the invention relevant to the scope of claims. Also, all combinations of the features described in the embodiments are not necessarily included in the solutions of the present invention.

First Embodiment

Figure 1:
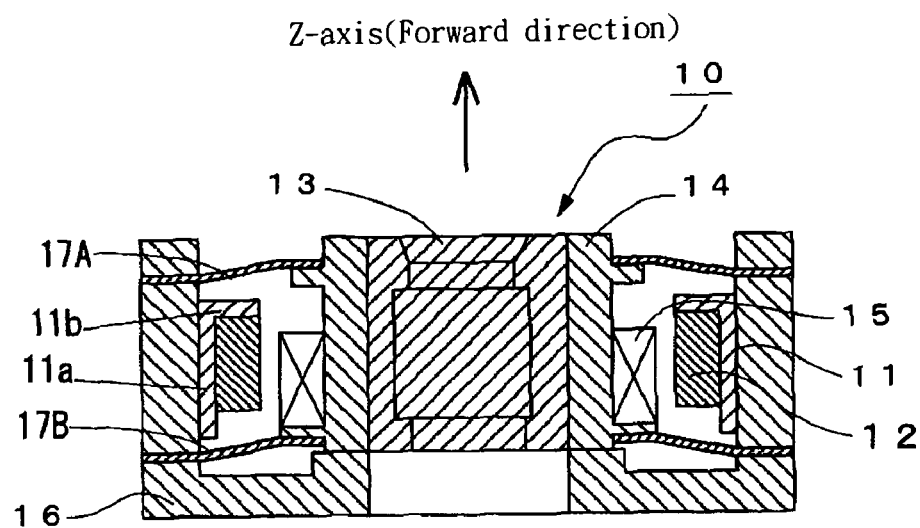
FIG. 1 is a cross-section view of a lens driving device in accordance with a first embodiment of the present invention.

FIG. 1 is a cross-section view of the lens driving device in accordance with the first embodiment of the present invention.

The lens driving device 10 is provided with: a yoke 11 made of magnetic substance, such as soft iron, a permanent magnet 12 mounted on an inner sidewall of the yoke 11, a lens set 13 constructed by at least one object lens and at least one ocular lens, a lens holder 14 for holding the lens set 13 at a center position, a driving coil 15 mounted on an outer sidewall of the lens holder 14, a casing 16 whose inner circumference being provided with the yoke 11, and an upper spring member 17A and a lower spring member 17B connecting the casing 16 and the lens holder 14.

Furthermore, the up-and-down direction in the present invention is the direction parallel to the optic axis of the lens set 13. The upper side of FIG. 1 is the side of the imaged object (not shown). In addition to the naming of the spring members 17A, 17B, the up-and-down direction will be also referred hereinafter as the direction of Z axis, wherein the upper side is referred as the forward direction of Z axis, and the lower side is referred as the backward direction of Z axis.

Spring members 17A, 17B, for example, are rounded-plate springs made of phosphor bronze with notches formed therein being surrounded by smooth, arc-shaped curves.

The spring members 17A, 17B are in the shape of flat plate if no bending moment is applied thereon. However, when mounted with the lens holder 14 and the casing 16, the spring members 17A, 17B are in a deflected state with bending moment applied thereon, such that the fulcrums of the spring members 17A, 17B at the side of the casing 16 are positioned closer to the backward direction of Z axis than the fulcrums of the spring members 17A, 17B at the side of the lens holder 14. The restoring force generated by the deflection of the spring members 17A, 17B functions as the compressive stress biasing the lens holder 14 toward the casing 16. Therefore, the spring members 17A, 17B, under the condition of being applied with an offset biasing toward the backward direction of Z axis, are assembled between the fulcrums at the side of the lens holder 14 and the fulcrums at the side of the casing 16.

As shown in FIG. 1, yoke 11 is a member with L-shaped cross-section, having a vertical piece 11a extending in the direction of Z axis and a horizontal piece 11b protruding toward the lens holder 14 from one end of the vertical piece 11a close to the forward direction of Z axis, wherein the vertical piece 11a is mounted on the inner circumference of the casing 16.

Cylindrical magnet is used as the permanent magnet 12 in the present invention. In this embodiment, the polarity of the permanent magnet 12 at the side of the lens holder 14 is N-polarity.

In the present invention, the driving coil 15 is placed in a radially-distributed magnetic field applied by the yoke 11 and the permanent magnet 12 around the coil. Therefore, when the driving coil 15 is powered, a Lorentz force toward the direction of the imaged object (i.e. the forward direction of Z axis as indicated in arrow) is generated and exerts on the driving coil 15. As the Lorentz force increases along with the increase of driving current, the lens holder 14 will start to move toward the forward direction of Z axis when the Lorentz force exceeds the compressive stress of the spring members 17A, 17B. Meanwhile, the restoring force of the spring members 17A, 17B will also increase with movement of the lens holder 14 toward the forward direction of Z axis, and the lens holder 14 will be moved to the position where Lorentz force and the restoring force of the spring members 17A, 17B are balanced.

That is, by manipulating the current value powering the driving coil 15, the displacement of the lens holder 14 may be controlled to determine the position of the lens set 13.

Figure 2:
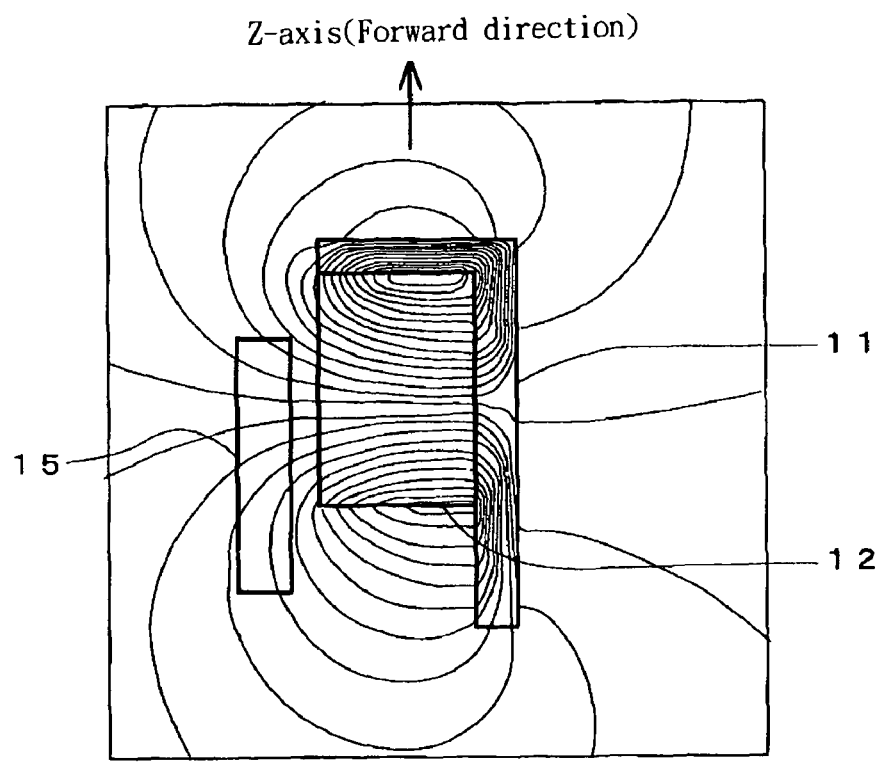
FIG. 2 is a contour diagram of the distribution of the magnetic field component orthogonal to the Z axis applied by the driving coil in the lens driving device in accordance with the first embodiment.

FIG. 2 is a contour diagram illustrating the field distribution of the magnetic field orthogonal to the Z axis applied radially by the permanent magnet 12 toward the driving coil 15 when the lens holder 14 props against the casing 16 (i.e. in the initial position set in the present invention).

In the initial position, the driving coil 15 and permanent magnet 12 are placed where the Z-axis center position of the driving coil 15 is closer to the backward direction of Z axis than the Z-axis center position of the permanent magnet 12. Accordingly, the portion of the driving coil 15 close to the backside of Z axis will not be influenced by the magnetic field applied on the driving coil 15. The magnitude of the driving magnetic field intersecting with the driving coil 15 is only about 50%~90% of the maximum value of the driving magnetic field intersecting with the driving coil 15 during the lens holder 14 moves toward the imaged object. In particular, in the condition that the magnitude of the driving magnetic field intersecting with the driving coil 15 is 80% of the maximum value of the driving magnetic field intersecting with the driving coil 15 during the lens holder 15 moves toward the imaged object, the linearity of driving current vs. displacement is optimum, and high displacement sensitivity (the increment of displacement with respect to the increment of driving current) may be obtained.

Figure 3:
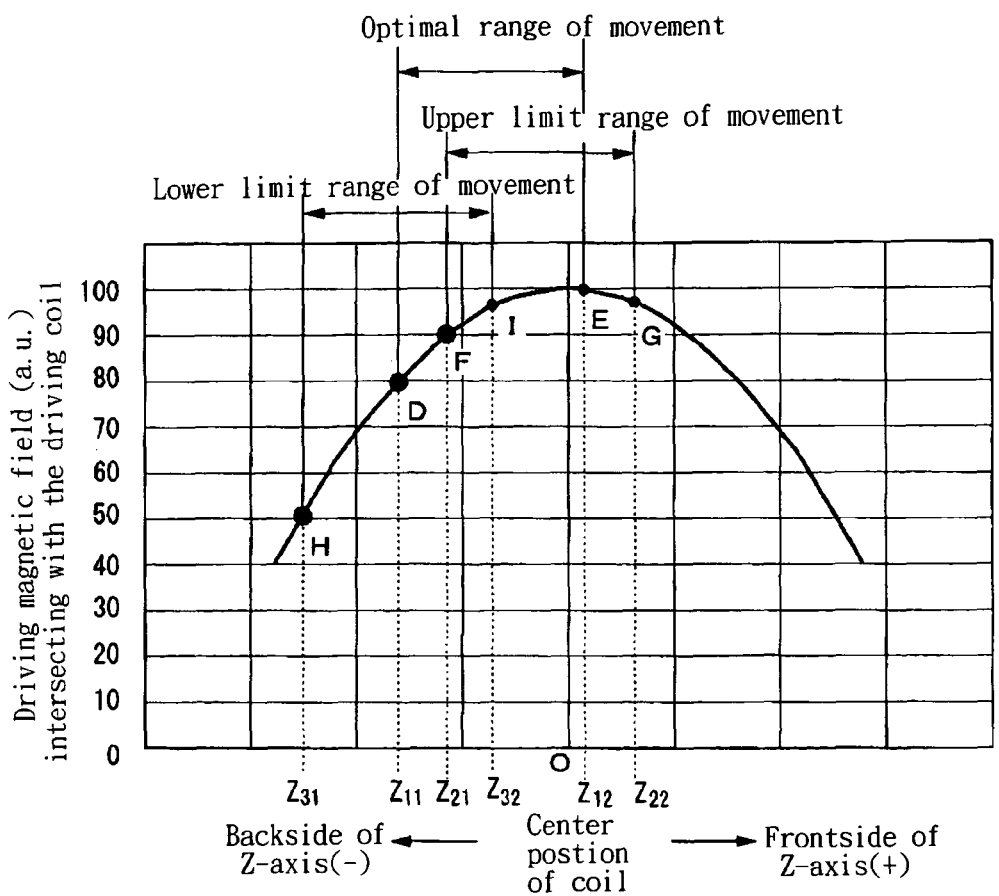
FIG. 3 is a diagram illustrating the relation between the position of the driving coil and the driving magnetic field.

Please refer to FIG. 3 for the detailed description why the initial position (the Z-axis center position of the driving coil 15 with respect to the Z-axis center position of the permanent magnet 12) is set where the magnitude of the driving magnetic field intersecting with the driving coil 15 is 50%~90% of the maximum value.

In FIG. 3, the horizontal axis represents the relative position of the Z-axis center position of the driving coil 15 with respect to the Z-axis center position of the permanent magnet 12. The original point O is the Z-axis center position of the driving coil 15 when the Z-axis center position of the driving coil 15 coincides with the Z-axis center position of the permanent magnet 12. Furthermore, the right side ("+" direction) represents the Z-axis center position of the driving coil 15 is closer to the forward direction of Z-axis than the Z-axis center position of the permanent magnet 12, while the left side ("−" direction) represents the Z-axis center position of the driving coil 15 is closer to the backward direction of Z-axis than the Z-axis center position of the permanent magnet 12.

Furthermore, the vertical axis represents the magnitude of the driving magnetic field intersecting with the driving coil 15 at each position where the driving coil 15 is placed. Also, the magnitude of the magnetic field is normalized such that the maximum value of the magnetic field is 100%.

In this embodiment, the Z-axis center position of the driving coil 15 at the initial position is positioned at $Z_{11}$ where the magnitude of the driving magnetic field intersecting with the driving coil 15 is 80% of the maximum value of the magnitude of magnetic field (referred hereinafter as the maximum value). The lens holder 14 may move along the positions corresponding to the convex curve showing the distribution function of the magnetic intensity from point D to point E in FIG. 3. That is, the lens holder 14 will move between $Z_{11}$~$Z_{12}$. The relation of driving current versus displacement at this configuration is shown in FIG. 4.

Figure 4:
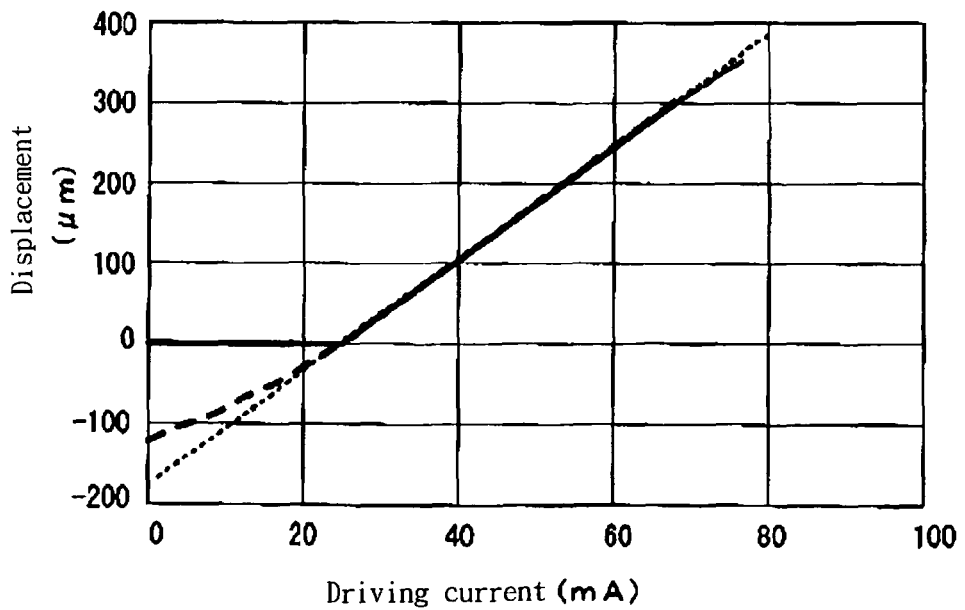
FIG. 4 is a diagram illustrating the relation of driving current vs. displacement when the initial position of the driving coil with respect to the permanent magnets is an optimal position.

FIG. 4 is a diagram of driving current versus displacement in the configuration that the dimension of the permanent magnet 12 in the direction of Z axis is 1 mm, the dimension of the driving coil 15 in the direction of Z axis is 1 mm, the offset applied on the spring members 17A, 17B is 0.1 mm (100 μm), the moving range of the lens holder 14 is 0.35 mm, the initial current value is 25 mA, and the initial position of the driving coil 15 is located at the point D shown on the curve of FIG. 3 (the distribution function of magnetic intensity).

By setting the initial position of the driving coil 15 at point D, excellent linearity of driving current versus displacement may be obtained within the whole moving range of the lens holder 14, and a high displacement sensitivity of 7 μm/mA may also be achieved (the displacement increment relative to the increment of the driving current).

Besides, the dimension of the permanent magnet 12 and so on in the present invention is exemplary and not being limited thereto. Appropriate modifications and changes may be made by those skilled in art from the teaching of the present invention.

Also, under the condition without applying any offset on the spring members 17A, 17B, the relation of driving current versus displacement with the driving current being 0~25 mA is represented by a bold dash line shown in FIG. 4.

Figure 13:
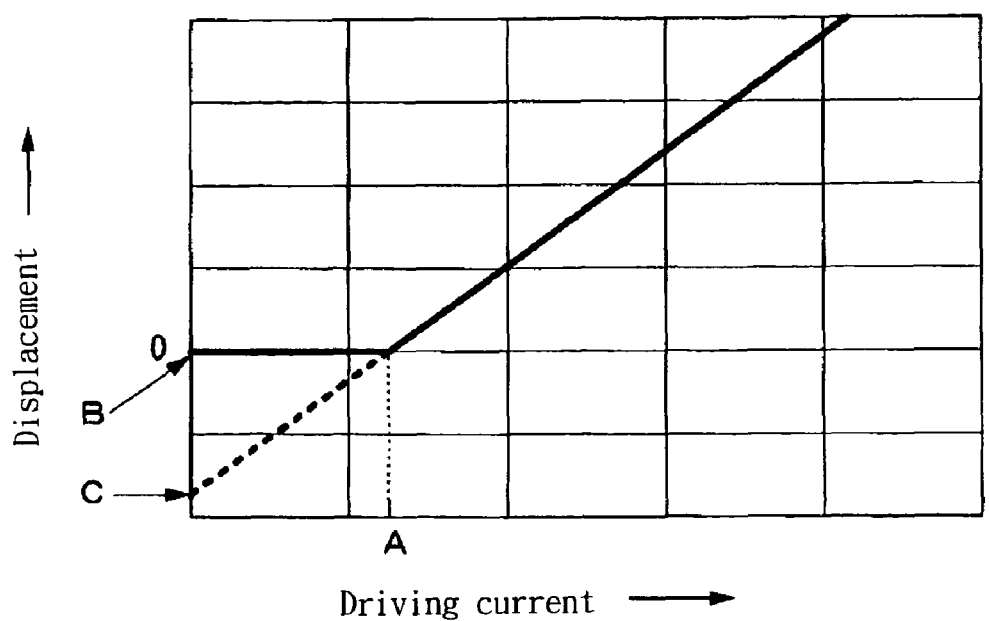
FIG. 13 is a diagram illustrating the relation of driving current vs. displacement in an ideal lens driving device.

When applying even driving magnetic field on the driving coil 15 as described in the illustration of driving current versus displacement diagram in FIG. 13, the offset applied on the spring members 17A, 17B must increase, more specifically, reach 175 μm, in order to obtain an initial driving current value of 25 mA and a displacement sensitivity of 7 μm/mA. However, when the offset is increased, the dimension of the lens driving device in the direction of Z axis is also increased. This will make miniaturizing the lens driving device more difficult.

On the other hand, if the offset is set as 100 μm and initial current value is set as 25 mA, the displacement sensitivity is only 4 μm/mA. This makes it more difficult to ensure the displacement sensitivity.

When applying even magnetic field on the driving coil 15, and as the embodiment illustrates in FIG. 4, the initial position of the driving coil 15 is set at a place where the magnitude of the driving magnetic field intersecting with the driving coil 15 is at 80% of the maximum value. This creates an offset of 100 μm, an initial current value of 25 mA, and a high displacement sensitivity of 7 μm/mA.

Thus, when the initial position of the driving coil 15 is located at the point D of the distribution function of magnetic intensity, the magnitude of driving magnetic field intersecting with the driving coil 15 is at 80% of the maximum value. The restoring force from the offset of the spring members 17A, 17B will exceed the Lorentz force generated by the driving coil 15 until the current value reaches 25 mA (initial current value). The lens holder 14 will remain propping against the casing 16 at this point.

By further increasing the power level and surpassing the initial current value, the Lorentz force generated by the driving coil 15 will exceed the restoring force of the spring members 17A, 17B. As a result, the lens holder 14 will start to move forward on Z axis.

In this embodiment, the magnitude of the driving magnetic field intersecting with the driving coil 15 mounted on the lens holder 14 will exceed 80% of the maximum value when the lens holder 14 starts to move forward on Z axis. The Lorentz force per current unit will increase. Thus, the lens holder 14 may move along the ideal line of 7 μm/mA in the figure.

When the center position of the driving coil 15 moves further out in the forward direction of Z-axis than the center position of the permanent magnet 12, the Lorentz force per current unit will, therefore, decrease. As shown in FIG. 4, the relation of driving current versus displacement will start to deviate from the ideal line. Nonetheless, the deviation is not significant. The relation of driving current versus displacement is still highly linear in this embodiment.

In the following, the example that the upper limit of the driving magnetic field intersecting with the driving coil 15 at the initial position is 90% of the maximum value will be described.

Figure 5:
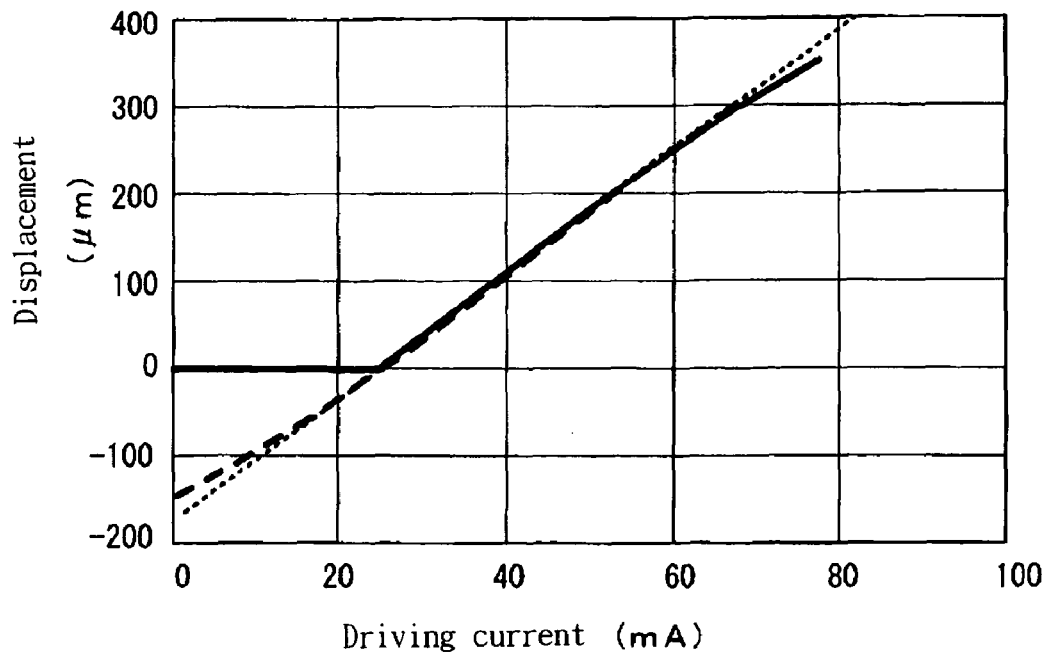
FIG. 5 is a diagram illustrating the relation of driving current vs. displacement when the initial position of the driving coil with respect to the permanent magnet is at an upper limit position.

Under the initial circumstance that the Z-axis center position of the driving coil 15 at the initial position is set at the position $Z_{21}$ corresponding to the point F in FIG. 3 (The magnitude of the driving magnetic field intersecting with the driving coil 15 is 90% of the maximum value). The lens holder 14 may move along the positions corresponding to the curve from point D to point E in FIG. 3. That is, the lens holder 14 may move between the position $Z_{21}$ and $Z_{22}$. The relation of driving current versus displacement during this moving period is shown in FIG. 5. Also, the configuration of the lens driving device in this embodiment, such as offset and the dimensions of the permanent magnet 12 and driving coil 15, is similar to the illustration of FIG. 4.

When the initial position of the driving coil 15 is located at the point F where the magnitude of the driving magnetic field intersecting with the driving coil 15 is 90% of the maximum value, the restoring force of the spring members 17A, 17B applied with offset will exceed the Lorentz force generated by the driving coil 15 until the driving current value reaches 25 mA (initial current value). Prior to that, the lens holder 14 will remain propping against the casing 16.

In this embodiment, further increasing the power level will cause the driving current exceed the initial current value, the Lorentz force generated by the driving coil 15 will exceed the restoring force of the spring members 17A, 17B. As a result, the lens holder 14 starts to move forward on Z axis.

The magnitude of the driving magnetic field intersecting with the driving coil 15 mounted on the lens holder 14 will exceed 90% if the lens holder 14 starts to move forward on Z axis. The Lorentz force per current unit will, therefore, increase. Thus, the lens holder 14 may move along the ideal line of 7 μm/mA in the figure.

Subsequently, further increasing the driving current will cause the Z-axis center position of the driving coil 15 to move beyond the Z-axis center position of the permanent magnet 12 toward the forward direction of Z axis. Under this situation, the Lorentz force per current unit will decrease. As a result, the relation of driving current versus displacement is a convex curve, as shown in FIG. 5. However, this deviation is still within the tolerance of linearity.

Also, without applying any offset on the spring members 17A, 17B, the relation of driving current versus displacement with driving current at 0~25 mA is represented by a bold dash line shown in FIG. 5.

Figure 6:
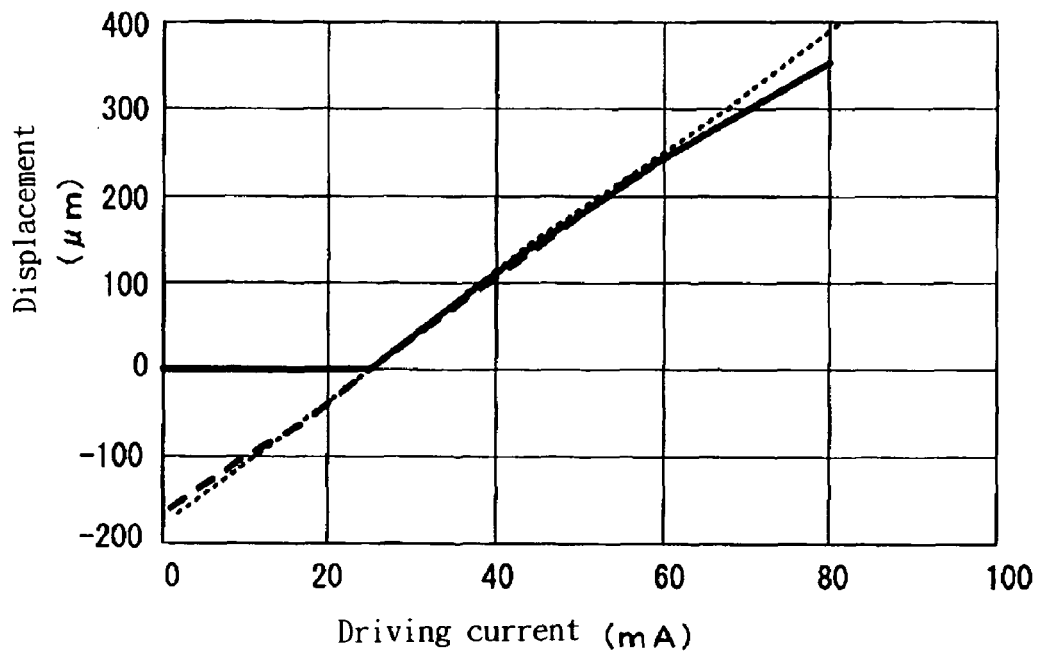
FIG. 6 is a diagram illustrating the relation of driving current vs. displacement when the initial position of the driving coil with respect to the permanent magnet is positioned closer to the forward direction of Z axis than the upper limit position.

When the driving magnetic field intersecting with the driving coil 15 at the initial position exceeds 90% of the maximum value (i.e. the upper limit equals to 94% in this case), as shown in FIG. 6, the relation of driving current versus displacement will be a convex curve deviating from the ideal line of 7 μm/mA, which is undesirable. Moreover, as represented by a dotted line shown in FIG. 6, this configuration increases the magnitude of offset and also makes it more difficult to achieve the low-profiling of the lens driving device.

Therefore, in order to obtain the lens driving device with good linearity of driving current versus displacement and with high displacement sensitivity, it is necessary to have the magnitude of the driving magnetic field intersecting with the driving coil 15 lower than 90% of the maximum value.

In the following, the example that the lower limit of the driving magnetic field intersecting with the driving coil 15 at the initial position is 50% of the maximum value will be described.

Figure 7:
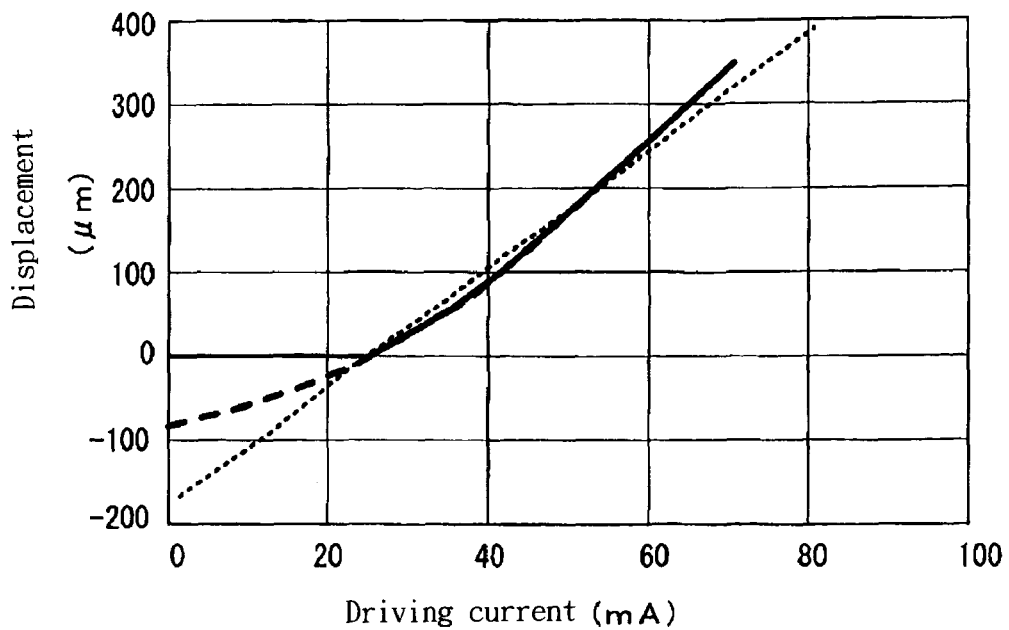
FIG. 7 is a diagram illustrating the relation of driving current vs. displacement when the initial position of the driving coil with respect to the permanent magnet is at a lower limit position.

When the Z-axis center position of the driving coil 15 at the initial position is set at the position $Z_{31}$ corresponding to the point H shown in FIG. 3, where the magnitude of the driving magnetic field intersecting with the driving coil 15 is 50% of the maximum value, the lens holder 14 may move along the positions corresponding to the curve from point H to point I in FIG. 3. That is, the lens holder 14 may move between position $Z_{31}$ and $Z_{32}$. The relation of driving current versus displacement under this configuration is shown in FIG. 7. Also, the configuration of the lens driving device, such as offset and the dimensions of the permanent magnet 12 and driving coil 15, is similar to the case of FIG. 4.

When the initial position of the driving coil 15 is located at the position corresponding to the point H where the magnitude of the driving magnetic field intersecting with the driving coil 15 is 50% of the maximum value, the restoring force of the spring members 17A, 17B applied with offset will exceed the Lorentz force generated by the driving coil 15 until the driving current value reaches 25 mA (initial current value). Prior to that, the lens holder 14 will remain propping against the casing 16.

However, further increasing the power level will cause the driving current to exceed the initial current value. The Lorentz force generated by the driving coil 15 will exceed the restoring force of the spring members 17A, 17B. As a result, the lens holder 14 starts to move forward on Z axis.

The magnitude of the driving magnetic field intersecting with the driving coil 15 mounted on the lens holder 14 will exceed 50% when the lens holder 14 starts to move forward on Z axis. The Lorentz force per current unit will also increase. Thus, the lens holder 14 may move along the ideal line of 7 μm/mA in the figure.

Subsequently, further increasing the driving current will make the relation of driving current versus displacement becoming a concave curve whose tangent line is beyond the desired ideal line, as shown in FIG. 7. However, in this case, this deviation is still in the tolerance of linearity.

Besides, without applying any offset on the spring members 17A, 17B, the relation of driving current versus displacement under the driving current at 0~25 mA is represented by a bold dotted line shown in FIG. 7.

Figure 8:
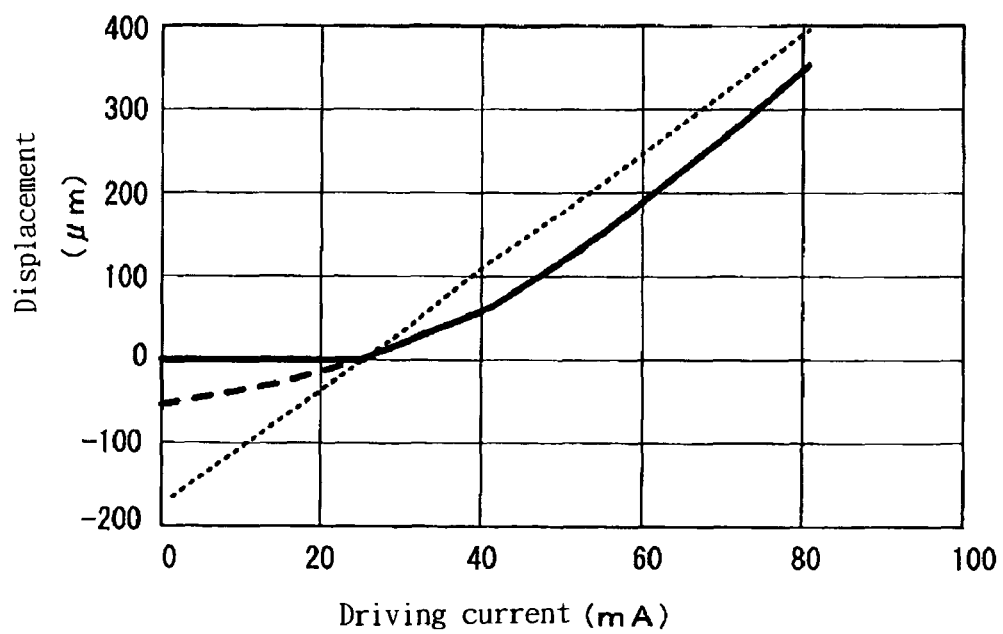
FIG. 8 is a diagram illustrating the relation of driving current vs. displacement when the initial position of the driving coil with respect to the permanent magnet is positioned closer to the backward direction of Z axis than the lower limit position.

In the present invention, if the driving magnetic field intersecting with the driving coil 15 at the initial position is less than 50% of the maximum value (i.e. the lower limit, 40% in this case), as shown in FIG. 8, sufficient displacement sensitivity may not be obtained even when the driving current exceeds the initial current value. This may, in turn, result in very small displacement. As a result, the relation of driving current versus displacement becomes a concave curve significantly deviating from the ideal line of 7 μm/mA without desired linearity.

Accordingly, in order to obtain the lens driving device with good linearity of driving current versus displacement and with high displacement sensitivity, it is necessary to have the magnitude of the driving magnetic field intersecting with the driving coil 15 higher than 50% of the maximum value.

In the first embodiment of the present invention, the casing 16 holding a yoke 11 whose inner circumference being mounted with the permanent magnet 12 is connected with the lens holder 14 whose outer circumference being mounted with the driving coil 15 by an upper spring member 17A and a lower spring member 17B. When the driving coil 15 is not powered, the lens holder 14 props against the casing 16 at the side opposite to the imaged object. For this configuration of the lens driving device 10 in the present invention, the position of the driving coil 15 on Z axis (i.e. the initial position where the lens holder 14 props against the casing 16) is located where the magnitude of the driving magnetic field intersecting with the driving coil 15 is 50%~90% of the maximum value of the driving magnetic field intersecting with driving coil 15 when the lens holder 14 is moved toward the imaged object. In such configuration, good linearity of driving current versus displacement and high displacement sensitivity may be obtained even the offset for the miniaturization of the device decreases. Therefore, the low-profile, miniaturized lens driving device 10 may be provided in the present invention.

Also, in the first embodiment, the polarity of the permanent magnet 12 at the side of the lens holder 14 may be either N-polarity or S-polarity. However, when the polarity at the side of the lens holder 14 is S-polarity, the winding direction of the driving coil 15 is reverse to the winding direction when the polarity at the side of the lens holder 14 is N-polarity.

Furthermore, though the cross-section of the yoke 11 in this embodiment is L-shaped with the permanent magnet 12 mounted on the inner sidewall thereof, the shape of the yoke 11 is not limited thereto. U-shape or J-shape may both be implemented in the present invention. And in some configuration, even the yoke 11 may be omitted. In the configuration with the yoke 11 omitted, the permanent magnet 12 is mounted on the inner sidewall of the casing 16 instead.

Also, the permanent magnet 12 in the present invention is not limited to the cylindrical magnet. It is possible to use a plurality of arc-shaped magnets or planar magnets circularly arranged on the inner sidewall of the casing 16 through the yoke 11.

Furthermore, it is not necessary to have the permanent magnet 12 cover and correspond to the whole circumference of the driving coil 15. The magnets may be scattered on the circumference of the driving coil 15. More specifically, it may be a plurality of arc-shaped magnets or planar magnets arranged spaced-apart on the yoke 11.

Second Embodiment

Figure 9:
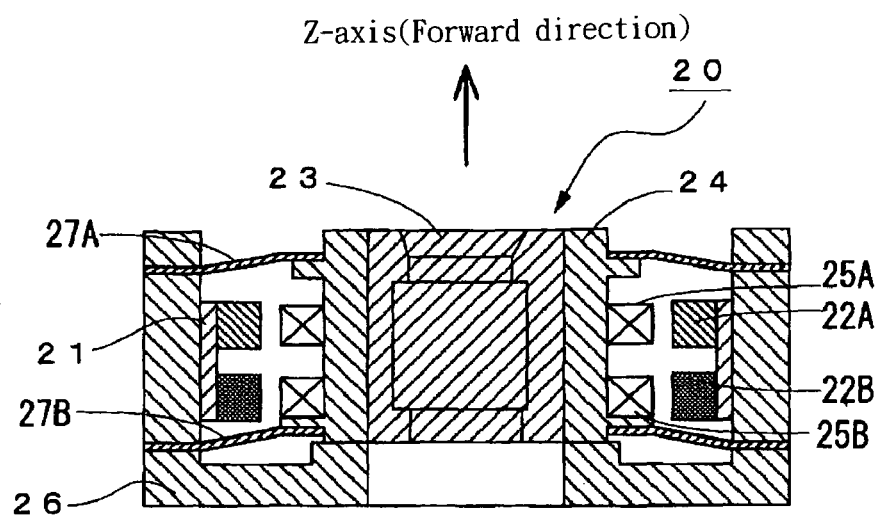
FIG. 9 is a cross-section view of a lens driving device in accordance with a second embodiment of the present invention.

FIG. 9 is a cross-section view of a lens driving device 20 in accordance with the second embodiment of the present invention. Component 21 is a yoke made of magnetic substance, such as soft iron. Components 22A, 22B are permanent magnets mounted on the inner sidewall of the yoke 21. Component 23 is a lens set constructed by at least one object lens and at least one ocular lens. Component 24 is the lens holder holding the lens set 23 at the center position. Components 25A, 25B is driving coils mounted on the outer sidewall of the lens holder 24. Component 26 is a casing with the yoke 21 mounted on the inner circumference thereof. Components 27A, 27B are an upper spring member and a lower spring member connecting with the casing 26 and the lens holder 24.

The spring members 27A, 27B are in the shape of flat plate if no bending moment is applied thereon. When mounted with the lens holder 24 and the casing 26, the spring members 27A, 27B are in a flexural state with the bending moment be applied thereon such that the fulcrums of the spring members 27A, 27B at the side of the casing 26 are positioned closer to the backward direction of Z axis than the fulcrums of the spring members 27A, 27B at the side of the lens holder 24. The restoring force generated by the flexure of the spring members 27A, 27B functions as the compressive stress biasing the lens holder 24 toward the casing 26. Therefore, the spring members 27A, 27B are assembled between the fulcrums at the side of the lens holder 24 and the fulcrums at the side of the casing 26 in the condition that an offset biasing toward the backward direction of Z axis is applied.

In this configuration, the driving coil 25A is mounted on the lens holder 24 close to the front side of Z axis, while the driving coil 25B is mounted on the lens holder 24 close to the back side of Z axis. Those driving coils 25A, 25B are wound respectively in the directions different from each other, forming a dual configuration with either parallel connection or serial connection of the coils.

The yoke 21 is a component with I-shaped cross-section mounted on the inner circumference of the casing 26.

The permanent magnets 22A, 22B in this embodiment may be cylindrical magnets, multiple arc-shaped magnets, or multiple planar magnets. In the case of multiple arc-shaped magnets or planar magnets being used, each magnet is circularly-arranged on the inner sidewall of the casing 26 through the yoke 21.

As shown in the figure, the permanent magnet 22A is placed at a position close to the forward direction of Z axis, while the permanent magnet 22B is placed at a position close to the backward direction of Z axis. The magnetic polarity of the permanent magnet 22A at the side facing the driving coil 25A and the magnetic polarity of the permanent magnet 22B at the side facing the driving coil 25B are different from each other.

For example, if the permanent magnet 22A has N polarity and the permanent magnet 22B has S polarity, the driving coil 25A will face the N polarity of the permanent magnet 22A, while the driving coil 25B wound in the reverse direction to the driving coil 25A will face the S polarity, which is opposite to the polarity facing the driving coil 25A.

The driving coils 25A, 25B are placed in the radially-distributed magnetic field applied by the yoke 21 and the permanent magnets 22A, 22B around the coils. Therefore, a Lorentz force will be generated toward the imaged object and exert on the driving coils 25A, 25B (the forward direction of Z axis as represented by the arrow in FIG. 9) when the driving coils 25A, 25B are powered. When the Lorentz force growing with the increase of driving current exceeds the compressive stress of the spring members 27A, 27B, the lens holder 24 will start to move forward on Z axis. Meanwhile, the restoring force of the spring members 27A, 27B will increase when the lens holder 24 moves forward on Z axis. Thus, the lens holder 24 will move to the position where Lorentz force and the restoring force of the spring members 27A, 27B are in equilibrium.

That is, by manipulating the current value powering the driving coil 25A, 25B, the displacement of the lens holder 24 may be controlled to determine the position of the lens set 23.

Figure 10:
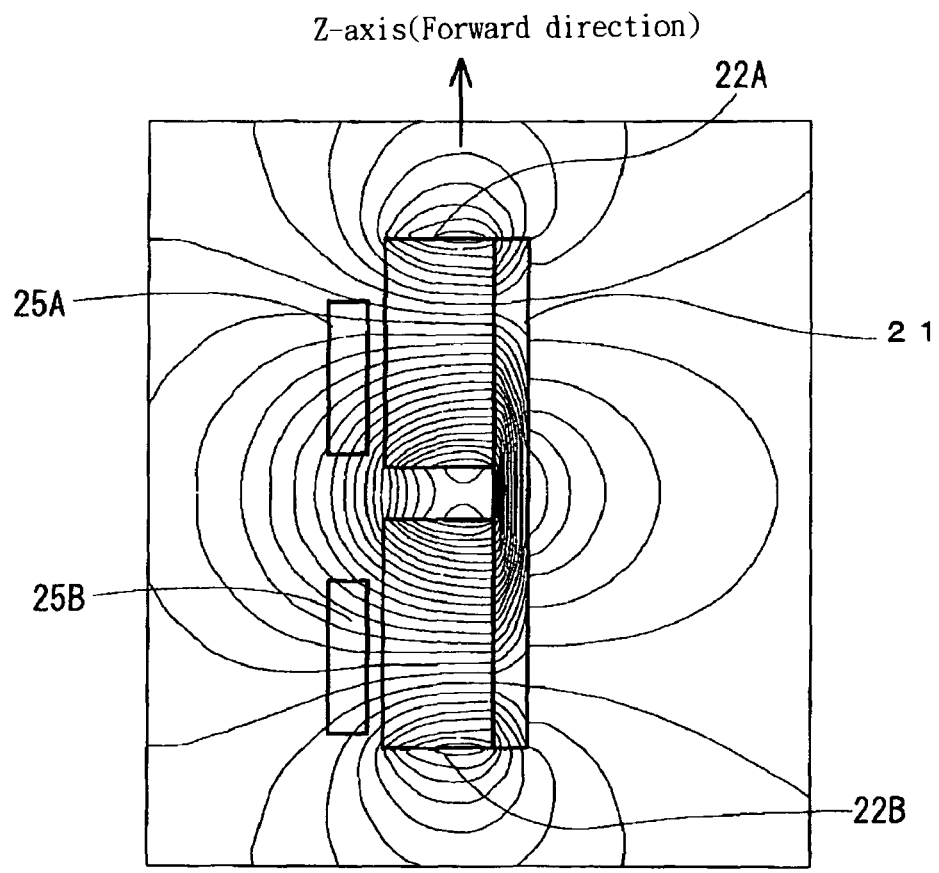
FIG. 10 is a contour diagram of the distribution of the magnetic field component orthogonal to the Z axis applied by the driving coil in the lens driving device in accordance with the first embodiment.

FIG. 10 is a contour diagram of field distribution of the magnetic field orthogonal to the Z axis of the driving magnetic field radially applied by the permanent magnets 22A, 22B onto the driving coils 25A, 25B at the initial position (i.e. the position where the lens holder 24 props against the casing 26).

At the initial position of this embodiment, the driving coils 25A, 25B and permanent magnets 22A, 22B are positioned where the Z-axis center position of the driving coil 25A, 25B as a whole is closer to the backside of Z-axis than the Z-axis center position of the permanent magnets 22A, 22B as a whole. Accordingly, the portion of the whole coil constituted by the driving coils 25A, 25B at the backside of Z axis may not be influenced by the full magnetic field.

Furthermore, under the initial position, the Z-axis center position of the driving coils 25A, 25B as a whole and the Z-axis center position of the permanent magnets 22A, 22B as a whole are placed where the magnitude of the driving magnetic field intersecting with the driving coils 25A, 25B is 50%~90% of the maximum value of the driving magnetic field intersecting with the driving coils 25A, 25B when the lens holder 24 moving toward the imaged object.

In the second embodiment, the polarities of the permanent magnet 22A and 22B are different from each other. Compared with the configuration of the first embodiment in which the permanent magnet 12 has only one polarity, the combination of the permanent magnet 22A and permanent magnet 22B may reduce the demagnetizing field. Therefore, the magnitude of the magnetic field may be increased to improve the linearity of driving current versus displacement and the displacement sensitivity of the device.

Third Embodiment

Figure 11:
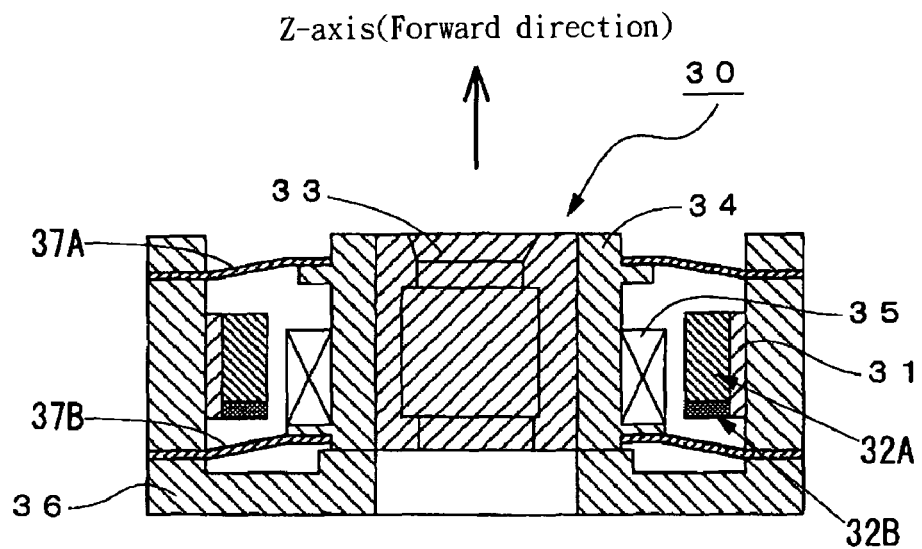
FIG. 11 is a cross-section view of a lens driving device in accordance with a third embodiment of the present invention.
Figure 12:
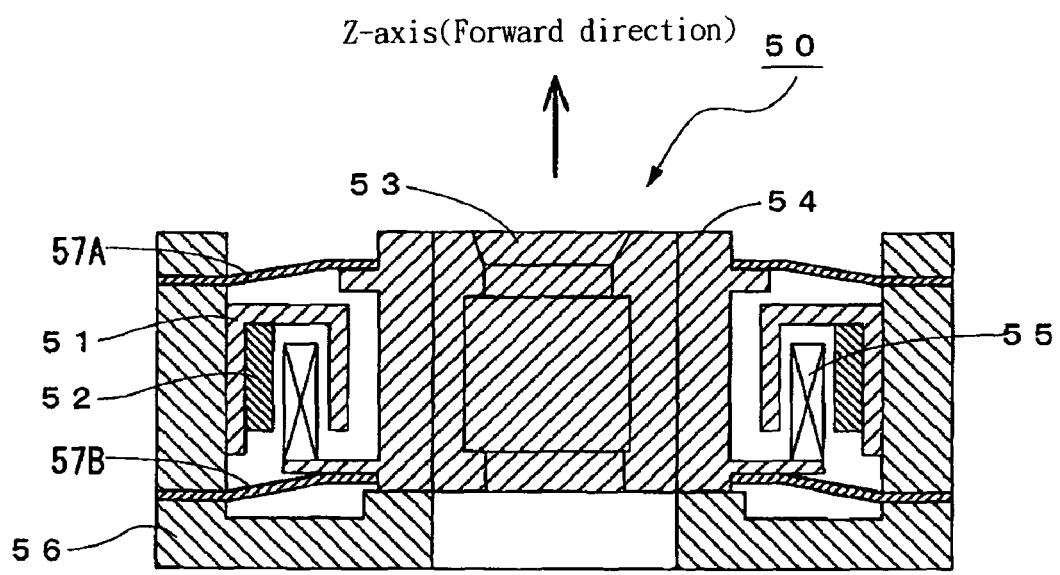
FIG. 12 is a cross-section view illustrating a configuration of a conventional lens driving device.

FIG. 11 is a cross-section view of a lens driving device 30 in accordance with a third embodiment of the present invention. Component 31 is a yoke made of magnetic substance, such as soft iron. Components 32A, 32B are permanent magnets mounted on the inner sidewall of the yoke 31. Component 33 is a lens set constructed by at least one object lens and at least one ocular lens. Component 34 is a lens holder holding the lens set 33 at a center position. Component 35 is a driving coil mounted on the outer sidewall of the lens holder 34. Component 36 is a casing with the yoke 31 mounted on the inner circumference thereof. Components 37A, 37B are upper spring member and lower spring member connecting with the casing 36 and the lens holder 34.

The spring members 37A, 37B are in the shape of flat plate if no bending moment is applied. When mounted with the lens holder 34 and the casing 36, the spring members 37A, 37B are in a flexural state with the bending moment be applied thereon such that the fulcrums of the spring members 37A, 37B at the side of the casing 36 are positioned close to the backward direction of Z axis than the fulcrums of the spring members 37A, 37B at the side of the lens holder 34. The restoring force generated by the flexure of the spring members 37A, 37B functions as the compressive stress biasing the lens holder 34 toward the casing 26. Therefore, the spring members 37A, 37B are assembled between the fulcrums at the side of the lens holder 34 and the fulcrums at the side of the casing 36 in the condition that an offset biasing toward the backward direction of Z axis is applied.

In this embodiment, the yoke 31 is a component with I-shaped cross-section mounted on the inner circumference of the casing 36.

The permanent magnets 32A, 32B in this embodiment may be cylindrical magnets, multiple arc-shaped magnets, or multiple planar magnets. In the case of multiple arc-shaped magnets or planar magnets are used, each magnet is circularly-arranged on the inner sidewall of the casing 36 through the yoke 31.

As shown in the figure, the permanent magnet 32A is placed close to the forward direction of Z axis, while the permanent magnet 32B is placed close to the backward direction of Z axis. The magnetic polarity of the permanent magnet 32A at the side facing the driving coil 35A and the magnetic polarity of the permanent magnet 32B at the side facing the driving coil 35B are different from each other. And, the magnitude of the driving magnetic field from the permanent magnet 32A is larger than the magnitude of the driving magnetic field from the permanent magnet 32B.

The polarity of the permanent magnet 32A is configured such that the Lorentz force generated thereby exerts toward the forward direction of Z axis when the driving coil 35 is powered, while the polarity of the permanent magnet 32B is configured such that the Lorentz force generated thereby exerts toward the backward direction of Z axis when the driving coil 35 is powered.

Accordingly, the portion of the driving coil 35 at the backside of Z axis may not be influenced with full magnetic field, and the magnitude of the driving magnetic field intersecting with the driving coil 35 is 50%~90% of the maximum value of the driving magnetic field intersecting with the driving coil 35 when the lens holder 34 moves toward the imaged object.

The driving coil 35 is placed in radially-distributed magnetic field applied by the yoke 31 and the permanent magnets 32A, 32B around the coil. Therefore, when the driving coil 35 is powered, it will generate a Lorentz force exerting toward the imaged object (i.e. the forward direction of Z axis represented by the arrow shown in FIG. 11). When the Lorentz force growing with the increase of driving current exceeds the compressive stress of the spring members 37A, 37B, the lens holder 34 will start to move forward on Z axis. Meanwhile, the restoring force of the spring member 37A, 37B will increase when the lens holder 34 moves forward on Z axis. Thus, the lens holder 34 will move to the position where Lorentz force and the restoring force of spring members 37A, 37B are in equilibrium.

That is, by manipulating the current value powering the driving coil 35, the displacement of the lens holder 34 may be controlled to determine the position of the lens set 23.

In this embodiment, the permanent magnet 32B with polarity different from the permanent magnet 32A and with the magnitude of driving magnetic field smaller than permanent magnet 32A is placed at the backside of Z axis such that the portion of the driving coil 35 at the backside of Z axis may not be influenced with full magnetic field. Furthermore, compared with the configuration of the permanent magnet 12 in previous embodiment with only one polarity, the combination of the permanent magnet 32A and the permanent magnet 32B may reduce the demagnetizing field. Even though the Lorentz force caused by the magnetic field of the permanent magnet 32B is toward the backward direction of Z axis, the magnitude of the magnetic field may increase after the lens holder 34 starts to move. This may further improve the linearity of driving current versus displacement and the displacement sensitivity of the device.

The embodiments of the present invention described hereinbefore are only for the exemplary use, not intended to limit the scope of the present invention by the described embodiments. It is apparent for those ordinarily skilled in the art that various modifications and alterations of the present invention may be made thereto within the scope and spirit of the appended claims. It is apparent from the claims that the configurations with such modifications and alterations are included in the scope of the present invention.

According to the description above, the present invention can provide a low-profile, compact lens driving device capable of maintaining appropriate offset and initial current value, and having high linearity and good displacement sensitivity.

What is claimed is:

1. A lens driving device, comprising:
a lens holder for holding at least one lens;
a driving coil installed on an outer sidewall of said lens holder and wound around an optical axis of the lens;
at least one permanent magnet arranged in proximity of an outer circumference of said driving coil and spaced-apart from said driving coil;
a casing for holding said permanent magnet; and
spring members connecting with said lens holder and said casing;
wherein when said driving coil is not powered, compressive stress of said spring members causes said lens holder to prop against said casing at a side opposite to an imaged object, while when said driving coil is powered, said lens holder is moved toward said imaged object, said lens driving device is characterized in that:
when said driving coil is not powered, the magnitude of driving magnetic field intersecting with said driving coil at a position of said driving coil in a direction parallel to said optical axis of the lenses is 50%~90% of a maximum value of the driving magnetic field intersecting with said driving coil while said lens holder moves toward the imaged object.

2. The lens driving device of claim 1, wherein a polarity of said permanent magnet close to a side of said lens holder is either all N-polarity, or all S-polarity.

3. The lens driving device of claim 1, wherein said driving coil further comprises a first coil and a second coil winding in the directions different from each other, said second coil is placed at a side of said first coil close to the imaged object, said permanent magnet further comprises a first magnet and a second magnet whose polarities differ from each other at their sides close to said lens holder, said first magnet is placed opposite to said first coil, and said second magnet is placed opposite to said second coil.

4. The lens driving device of claim 1, wherein said permanent magnet further comprises an upper magnet placed close to the imaged object and a lower magnet placed close to the opposite of the imaged object, said lower magnet close to said lens holder has a polarity different from that of said upper magnet, and a magnitude of magnetic field of said lower magnet intersecting with said driving coil is smaller than a magnitude of magnetic field of said upper magnet intersecting with said driving coil.

* * * * *